United States Patent [19]

Sugasawa et al.

[11] Patent Number: 4,974,875
[45] Date of Patent: Dec. 4, 1990

[54] DEVICE FOR CONTROLLING DRIFT OF VEHICLE DURING CORNERING

[75] Inventors: Fukashi Sugasawa; Masatsugu Yokote, both of Yokohama; Takashi Imaseki, Zushi; Tomohiro Yamamura, Yokosuka, all of Japan

[73] Assignee: Nissan Motor Company, Ltd., Japan

[21] Appl. No.: 454,539

[22] Filed: Dec. 21, 1989

[30] Foreign Application Priority Data

Dec. 29, 1988 [JP] Japan .................................. 63-331313

[51] Int. Cl.⁵ ............................................. B60G 11/26
[52] U.S. Cl. ..................................... 280/772; 280/707
[58] Field of Search ................................ 280/707, 772

[56] References Cited

U.S. PATENT DOCUMENTS

| 4,693,493 | 9/1987 | Ikemoto et al. | 280/772 |
| 4,761,022 | 8/1988 | Ohashi et al. | 280/772 |
| 4,872,701 | 10/1989 | Akatsu et al. | 280/772 |

FOREIGN PATENT DOCUMENTS 62-275814  11/1987  Japan .

Primary Examiner—Kenneth R. Rice
Attorney, Agent, or Firm—Lowe, Price, LeBlanc, Becker & Shur

[57] ABSTRACT

A power drift control device produces a yaw moment in the direction of causing oversteer on the basis of acceleration and steering wheel angle during cornering of a vehicle. The yaw moment is variable depending upon variation of acceleration at a rate which increases as a steering wheel angle increases.

9 Claims, 6 Drawing Sheets

DEVICE FOR CONTROLLING DRIFT OF VEHICLE DURING CORNERING

BACKGROUND OF THE INVENTION

1. Field of the Invention

The present invention relates to a device for controlling drift of a vehicle during cornering, which drift is intentionally caused by sideslip of accelerated rear driving wheels for directing the vehicle into a desired course rapidly. This kind of drift is usually called power drift.

2. Description of the Prior Art

An example of a power drift control device for a vehicle is disclosed in Japanese Patent Provisional Application No. 62-275814. During cornering, particularly sharp or rapid cornering, a vehicle is subjected to lateral acceleration. Load movement thus occurs between the laterally spaced wheels.

The power drift control device controls the load movement between the wheels in such a manner that larger load movement occurs between the rear wheels while smaller load movement occurs between the front wheels, whereby to make smaller the total cornering force of the rear wheels than that of the front wheels. By this, a yaw moment in the direction of causing oversteer is produced, thus making it easy to attain power drift, i.e., attain sideslip or drift of the rear driving wheels by acceleration during cornering.

The prior art device is adapted to determine the above distribution of the load movement, i.e., the yaw moment in the direction of causing oversteer on the basis of driving force or acceleration only. This cannot always meet the requirement.

For example, though acceleration of the vehicle is constant, more rapid turn is required as the steering wheel angle becomes larger, i.e., a larger yaw moment in the direction of causing oversteer is required. The prior art control device, however, is not responsive to the steering wheel angle, thus causing a problem that desired power drift cannot be attained when the steering wheel angle is large, e.g., in case of a vehicle tending to understeer it becomes impossible to attain power drift of itself.

However, if the control device is designed so that a large yaw moment in the direction of causing oversteer can be produced by acceleration, the yaw moment becomes too large in a small steering wheel angle range to cause an unstable behavior of a vehicle as swerving.

SUMMARY OF THE INVENTION

In accordance with the present invention, there is provided a power drift control device for a vehicle which comprises cornering detecting means for detecting cornering of the vehicle and producing a signal representative of same, acceleration detecting means for detecting acceleration of the vehicle and producing a signal representative of same, yaw moment producing means responsive to the signals from the cornering detecting means and the acceleration detecting means for producing a yaw moment in the direction of causing oversteer and variable at a yaw moment variation rate depending upon variation of acceleration of the vehicle, steering wheel angle detecting means for detecting a steering wheel angle and producing a signal representative of same, and yaw moment variation rate altering means responsive to the signal from the steering wheel angle detecting means for altering the yaw moment variation rate in such a manner that the yaw moment variation rate increases as the steering wheel angle increases.

The above structure is effective for solving the above noted problem inherent in the prior art device.

It is accordingly an object of the present invention to provide a power drift control device for a vehicle which can attain desired power drift even at a large steering wheel angle and can assuredly prevent an unstable behavior of the vehicle as swerving at a small steering wheel angle.

It is a further object of the present invention to provide a power drift control device of the above described character which is desirable from a safety driving point of view.

DESCRIPTION OF THE PREFERRED EMBODIMENTS

Figure 1:
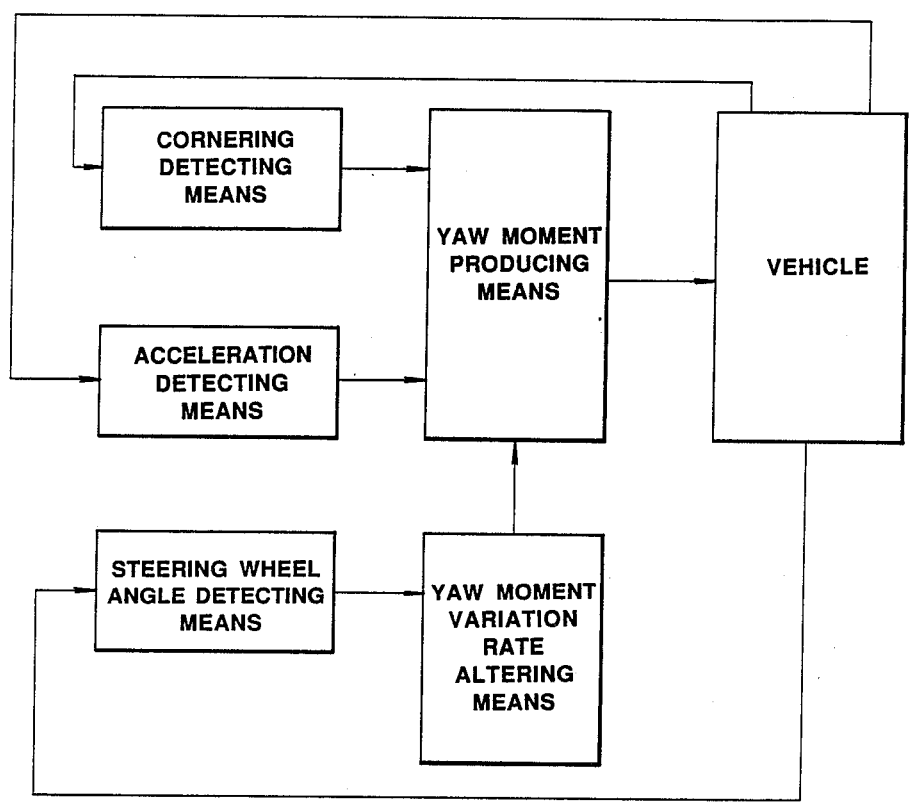
FIG. 1 is a block diagram of a power drift control device for a vehicle according to the present invention.

Referring to FIG. 1, a concept of the present invention is first described. The power drift control device of this invention comprises a cornering detecting means for detecting cornering of a vehicle and producing a signal representative of same, an acceleration detecting means for detecting acceleration of the vehcle and producing a signal representative of same and a yaw moment producing means responsive to the signals from the cornering detecting means and the acceleration detecting means for producing a yaw moment in the direction of causing oversteer and variable at a yaw moment variation rate depending upon variation of acceleration of the vehicle.

In accordance with the present invention, the power drift control device further comprises a steering wheel angle detecting means for detecting a steering wheel angle and producing a signal representative of same, and a yaw moment variation rate altering means responsive to the signal from the steering wheel angle detecting means for altering the yaw moment variation rate in such a manner that the yaw moment variation rate increases as the steering wheel angle increases.

The present invention will be described more in detail with respect to several suspension systems embodying the present invention.

Figure 2:
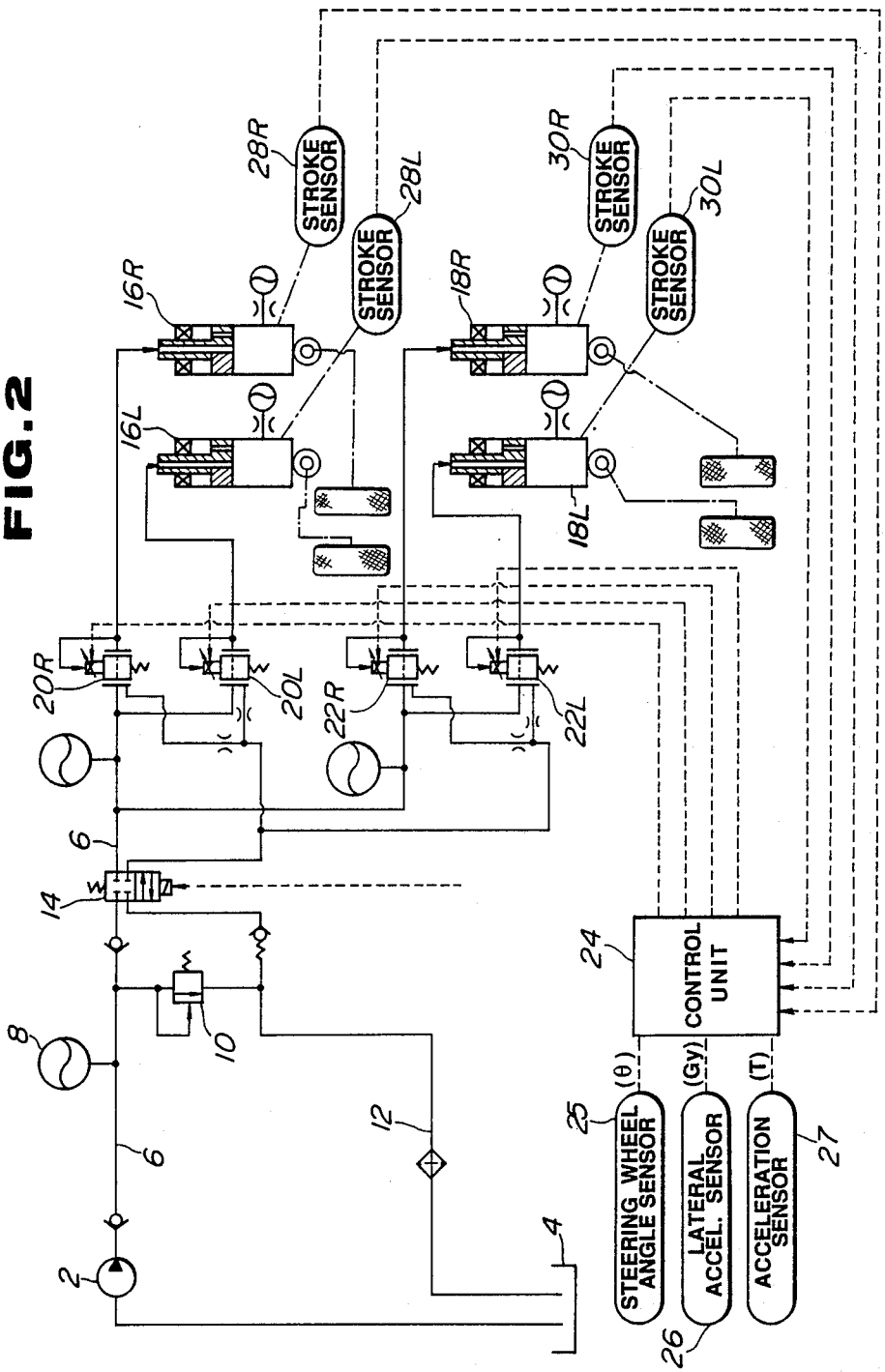
FIG. 2 is a diagramatic view of a hydraulic suspension system according to an embodiment of the present invention.

Referring to FIG. 2, a hydraulic suspension system according to an embodiment of the present invention includes an oil pump 2 driven by an engine (not shown)

installed on a vehicle. The pump 2 draws hydraulic fluid from a reservoir 4 and discharges it into a hydraulic fluid supply circuit 6 for thereby accumulating hydraulic pressure in an accumulator 8. When the hydraulic pressure in the accumulator 8 becomes higher than a predetermined pressure of an unloading pressure control valve 10, the unloading pessure control valve 10 discharges excess fluid into a drain circuit 12 for thereby maintaining the hydraulic pressure in the supply circuit 6 at a predetermined value. A shutoff valve 14 in the form of a solenoid operated normally closed directional control valve is disposed in the circuits 6 and 12 for normally obstructing communication between the circuits 6 and 12 and establishing communication between same when the engine is in operation to produce an ignition signal "IG".

Suspension units 16L and 16R are provided for suspending left and right front wheels (not shown) from a vehicle body (not shown), respectively. Suspension units 18L and 18R are provided for suspending left and right rear wheels from the vehicle body. The hydraulic pressures within the suspension units 16L, 16R, 18L and 18R are controlled independently by respective solenoid controlled proportional pressure relief valves 20L, 20R, 22L and 22R which open to the drain circuit 12 at opening degrees proportional to electric current supplied thereto.

The electric current to be supplied to the valves 20L, 20R, 22L and 22R are determined by a control unit 24. To this end, the control unit 24 receives a signal from a steering angle sensor 25 for detecting a steering angle $\theta$ of the vehicle, a signal from a lateral acceleration sensor 26 for detecting a lateral acceleration Gy of the vehicle, an acceleration sensor 27 for detecting depression on an unshown accelerator pedal (i.e., driving force or accelerating force T), and signals from stroke sensors 28L, 28R, 30L and 30R for detecting strokes of the suspension units 16L, 16R, 18L and 18R though the signals represetative of detected strokes are not directly related to the present invention.

Figure 3:
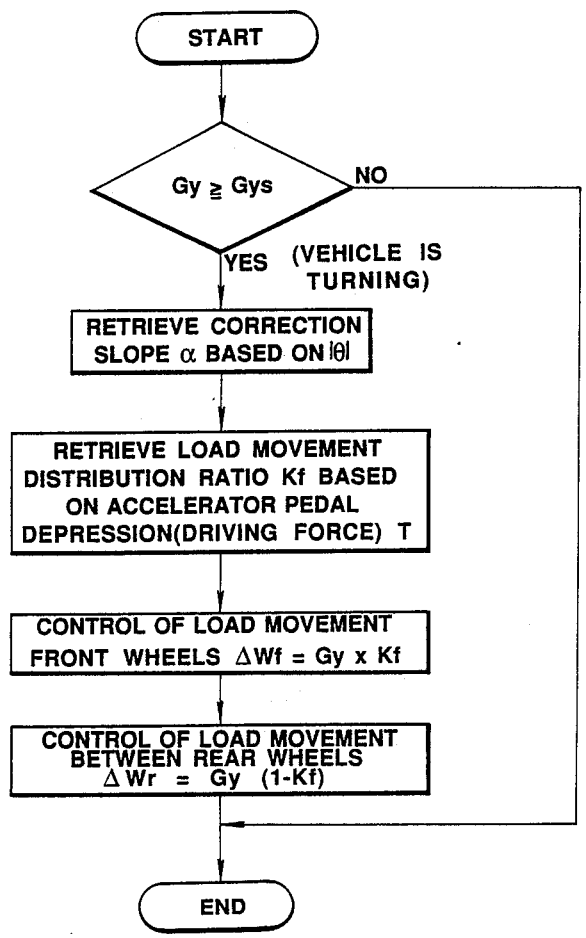
FIG. 3 is a flowchart of a program for the power drift control in the suspension system of FIG. 2.

The control unit 24 excutes a control program shown in FIG. 3 based on the above input signals and controls the hydraulic pressures within the suspension units 16L, 16R, 18L and 18R for controlling movement of load between the wheels and thereby controlling power drift. In the first place, it is judged whether the vehicle is turning a corner on the bais of judgement of whether the lateral acceleration Gy detected by the sensor 26 is larger than a predetermined value Gys. When the vehicle is not turning a corner, the power drift control according to the present invention is unnecessary so that the control finishes at once. When the vehicle is turning a corner, the following control is excuted according to the present invention.

Figure 4:
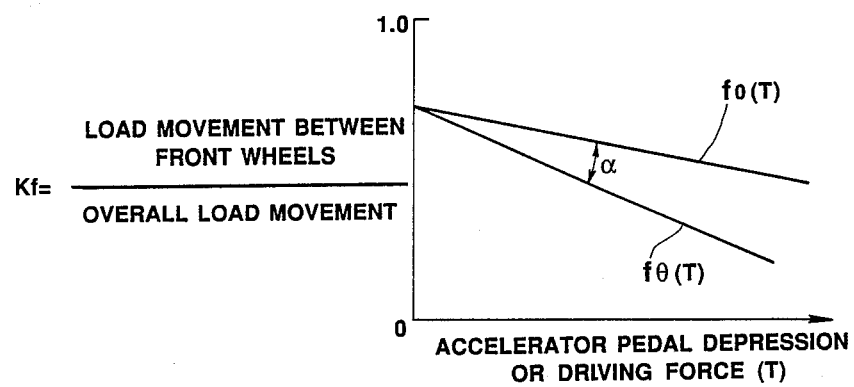
FIG. 4 is a graph of a ratio of load movement between front wheels to overall load movement between all wheels as a function of accelerator pedal depression or driving force.

Correction slope $\alpha$ is retrieved from a table data on the basis of the absolute value of the steering wheell angle $\theta$ detected by the sensor 25. In FIG. 4, a basic control function fo(T) is used for obtaining a ration Kf of load movement between front wheels to overall load movement between all wheels when the steerring wheel angle $\theta = 0$. A control function $f\theta(T)$ for an existing steering wheel angle $\theta$ is obtained on the basis of the basic control function fo(T) for the steering wheel angle $\theta = 0$ and the correction slope $\alpha$. In the meantime, when the steering wheel angle $\theta$ is small, it is desirable for a vehicle to travel without substantial sideslip of the tires and therefore power drift is not desired. The correction slope is thus set to zero, i.e., $\alpha = 0$, and therefore the control function fo(T) is used for determining the load movement ratio Kf.

In the next step as shown in FIG. 3, the correction slope $\alpha$ corresponding to the absolute value of the steering wheel angle $\theta$ is retrieved. Then, the control function $f\theta(T)$ is obtained on the basis of the correction slope $\alpha$ as shown in FIG. 4. Based on the control function $f\theta(T)$, the load movement ratio Kf corresponding to the driving force (accelerator pedal depression) T is retrieved.

The load movement between the front wheels $\Delta Wf$ is obtained from $\Delta Wf = Gy \times Kf$. The hydraulic pressures within the front wheel suspension units 16L and 16R are controlled by the solenoid controlled proportional pressure relief valves 20L and 20R in FIG. 2 so that the load movement $\Delta Wf$ is obtained. Thereafter, the load movement between the rear wheels $\Delta Wr$ is obtained from $\Delta Wr = Gy(1 - Kf)$. The hydraulic pressures within the suspension units 18L and 18R are controlled by the solenoid controlled proportional pressure relief valves 22L and 22R in FIG. 2 so that $\Delta Wr$ is obtained.

Figure 5:
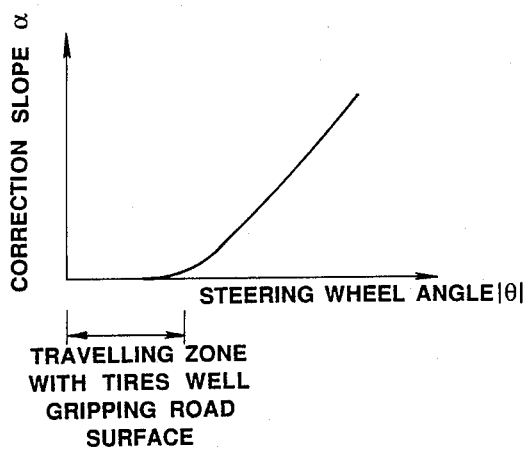
FIG. 5 is a graph of correction slope as a function of steering wheel angle.

As is apparent from FIGS. 4 and 5, by the above control, the load movement caused by turning is distributed less to the front wheels and more to the rear wheels as the steering wheel is rotated more away from the neutral position, i.e., the steering wheel angle $\theta$ becomes larger. Due to this, the total cornering force of the front wheels becomes larger than that of the rear wheels, thus causing a yaw moment in the direction of causing oversteer. This yaw moment increases with increase of the steering wheel angle $\theta$ and the driving force or accelerator pedal depression T.

Accordingly, when the steering wheel is turned largely or the driver increases the driving force T to attain power drift, a yaw moment in the direction of causing oversteer is produced, thus making it possible to attain desired power drift with ease. On the contrary, when the steering wheel angle $\theta$ is small or the driving force T is small, the above described yaw moment becomes small, thus making it possible to prevent an unstable behavior of the vehicle as swerving.

In case of travelling under the condition that the tires are well gripping road surface or highly resistant to spining or skidding, the correction slope $\alpha$ is set to zero. Accordingly, the load movement ratio Kf is determined by using the control function fo(T) shown in FIG. 4. Thus, so long as the vehicle is travelling under the condition that the tires are well gripping road surface, rotation of the steering wheel does not cause the yaw moment in the direction of causing oversteer, thus making it possible to prevent the driver from having a queer, uncomfortable feel that otherwise results when the yaw moment in the direction of causing oversteer is produced under this condition.

The hydraulic pressures within the suspension units for attaining the above described rated load movement between wheels will be described hereinafter.

First example of control:

The electric current to be supplied to the solenoid 20L, 20R, 22L and 22R are increased and decreased so as to control the hydraulic pressures within the suspension units 16L, 16R, 18L and 18R as follows. The fluid pressure within cornering outside one of the suspension units 16L and 16R for the front wheels is decreased by an amount corresponding to the above described result of calculation while on the contrary the fluid pressure within the cornering inside one is increased by the same amount as above. In this connection, the cornering inside is located remotor from the center of the turning arc than the cornering inside. On the other hand, the fluid pressures within the cornering outside one of the suspension units 18L and 18R for the rear driving wheels is increased by the same amount as above while on the contrary the fluid pressure within the cornering inside one is decreased by the same amount as above. By this, the lateral or sideway load movement between the front wheels becomes smaller since the roll rigidity at the front wheels becomes smaller, thus increasing the total cornering force of the front wheels, while at the same time the load movement between the rear wheels becomes larger since the roll rigidity at the rear wheels becomes larger, thus reducing the total cornering force. As a result, a yaw moment in the direction of causing oversteer is produced.

In case of such a control mode, the absolute values of loading variations of each wheels are the same. On the other hand, the load on a diagonally opposed pair of wheels increases while the load on the other diagonally opposed pair of wheels decreases, thus making it possible to attain load movement between the wheels without causing any positional change of the vehicle body. This is desirable since any positional change of the vehicle body will vary the load movement between the wheels.

Second example of control:

Another example for producing a yaw moment in the direction of causing oversteer for turning a corner by power drift is described below. In this example, supply of electric current to the solenoid controlled proportional control valves 20L, 20R, 22L and 22R is controlled so that the following variations of the hydraulic pressures within the suspension units are obtained. Of the hydraulic pressures within the cornering outside suspension units 18L and 28L or 18R and 28R for the front and rear wheels, the hydraulic pressure within the suspension unit for the rear wheel is increased by the amount corresponding to the above described result of calculation while on the contrary the hydraulic pressure within the suspension unit for the front wheel is lowered by the same amount as above. At the same time, of the hydraulic pressures within the cornering inside suspension units 18R and 28R or 18L and 28L for the front and rear wheels, the hydraulic pressure within the suspension unit for the rear wheel is lowered by the amount corresponding to the above described result of calculation while on the contrary the fluid pressure within the suspension unit for the front wheel is increased by the same amount as above. By this, load movement between the cornering outside pair of front and rear wheels (i.e., the pietch rigidity at the cornering outside wheels) in response to acceleration, while at the same time load movement between the cornering inside pair of the front and rear wheels (i.e., the pitch rigidity at the cornering inside wheels) is reduced. As a result, load movement between the front wheels becomes smaller while at the same time the load movement between the rear wheels becomes larger, thus attaining load movement similar to that of the first example and producing a yaw moment in the direction of causing oversteer.

This example can attain the control without causing any positional change of the vehicle body for the reason similar to that of the first example.

Third example of control:

In case where the control is allowed to cause positional change of the vehicle body, the hydraulic pressures within the cornering outside pair of the front and rear suspension units are increased while the fluid pressures within the cornering inside pair of the suspension units are lowered for attaining the pitch rigidity control similar to that of the second example.

Figure 6:
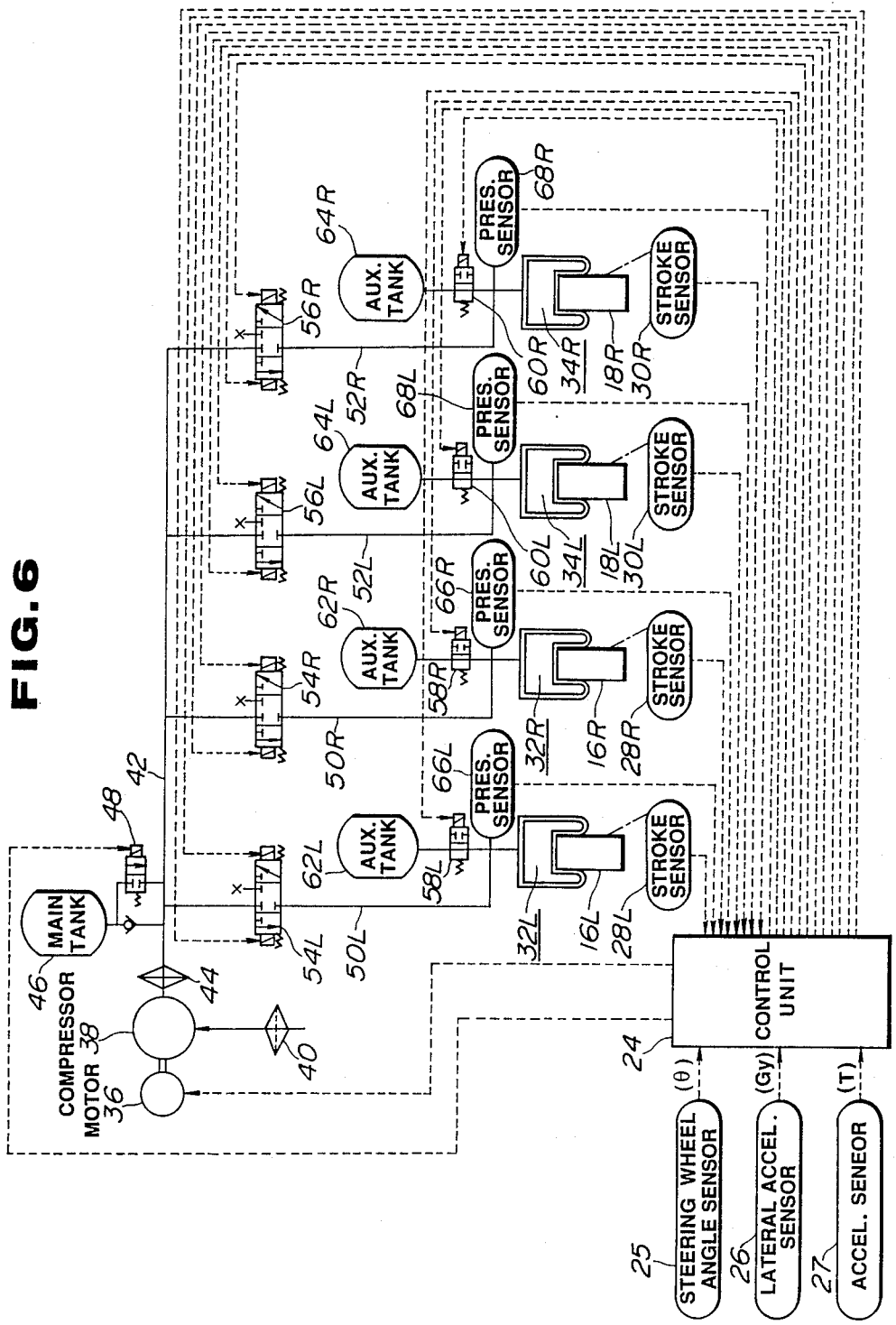
FIG. 6 is a diagramatic view of a pneumatic suspension system according to another embodiment of the present invention.

While the suspension system according to an embodiment of the present invention is shown as the hydraulic type in FIG. 2, the present invention may otherwise be applied to the pneumatic type as shown in FIG. 6.

In FIG. 6, each suspension units 16L, 16R, 18L and 18R are provided with air chambers 32L, 32R, 34L and 34R in place of the hydraulic fluid chambers so that the above described load movement is attained by increasing or decreasing the air pressures within the air chambers.

An air source is constituted by a compressor 38 which driven by a motor 36. The compressor 38 draws air through an air filter 40 and discharges it into an air supply circuit 42. The air discharged into the circuit is accumulated in a main tank 44 after being dried by a dryer 44 and is capable of being supplied into the circuit 42 by way of a main valve 48 which is operative to open when its solenoid is energized.

Pressure control valves 54L, 54R, 56L and 56R in the form of solenoid operated directional control valves are disposed in branch circuits 50L, 50R, 52L and 52R branching off from the air supply circuit 42 and connected to the air chambers 32L, 32R, 34L and 34R. The pressure control valves 54L, 54R, 56L and 56R are operative to hold the air pressures within the respective air chambers 32L, 32R, 34L and 34R constant when the solenoids (no numeral) on opposite sides thereof are deenergized, increase the air pressures when the left-hand solenoids in the drawing are energized and decrease the air pressures when the right-hand solenoids in the drawings are energized, whereby to control the air pressures within the air chambers independently.

The air chambers 32L, 32R, 34L and 34R are connected through shutoff valves 58L, 58R, 60L and 60R in the form of solenoid controlled normally open directional control valves to auxiliary tanks 62L, 62R, 64L and 64R, respectively. When the shutoff valves 58L, 58R, 60L and 60R are closed by energization of their solenoids, communications between the associated auxiliary tanks and air chambers are obstructed, thus increasing the spring constants of the associated suspension units.

The control unit 24 controls turning on and off of the motor 36, and energization and deenergization of the main valve 48, pressure control valves 54L 54R, 56L and 56R and shutoff valves 58L, 58R, 60L and 60R. To this end, the control unit 24 receives signals from various sensors similarly to the embodiment of FIG. 2 and in addition signals from pressure sensors 66L, 66R, 68L and 68R for detecting the air pressures within the air pressure chambers 32L, 32R, 34L and 34R.

In this embodiment, the control unit 24 excutes the control programs of FIG. 3 and controls the pressure control valves 54L, 54R, 56L and 56R and thereby controlling the air pressures within the air chambers 32L, 32R, 34L and 34R independently so that target load movement between wheels (i.e., target roll rigidity distribution or pitch rigidity distribution) is attained at the time of power drift during cornering. In this instance, the signals from the pressure sensors 66L, 66R, 68L and 68R are used as signals for feedback control of the air pressures within the air chambers.

Figure 7:
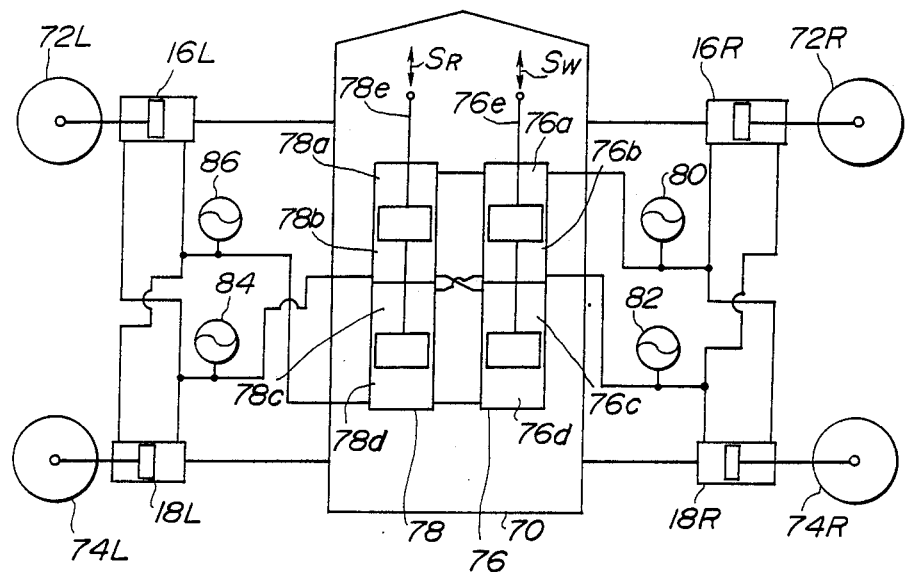
FIG. 7 is a schematic view of a suspension system according to a further embodiment of the present invention.

FIG. 7 shows a suspension system incorporating a power drift control device according to a further embodiment of this invention. In the figure, 70 is a vehicle body, 72L, 72R are front wheels and 74L, 74R are rear wheels. The wheels are suspended from the vehicle body 70 by means of hydraulic suspension units 16L, 16R, 18L and 18R. In this embodiment, hydraulic cylinders 76 and 78 for load movement control are provided. The cylinders are of the double piston type having chambers 76a, 76d and 78a, 78d, respectively. The both pistons are connected by piston rods 76e and 78e so as to be able to make strokes (indicated by $S_W$, $S_R$) as units, respectively.

The chambers 76a, 78a are fluidly connected to each other, while the chambers 76b, 78c, the chambers 76c, 78b and the chambers 76d, 78d are fluidly connected each other, respectively. The chamber 76a is connected to the expanding chamber of the suspension unit 16R and the contracting chamber of the suspension unit 18R through a line to which a gas spring 80 is connected for attaining suspension stroke. The chamber 76b is connected to the remaining chambers of the suspension units 16R and 18R through a line to which a gas spring 82 is connected for attaining suspension stroke. Further, the chamber 78b interconnects the contracting chamber of the suspension unit 16L and the expanding chamber of the suspension unit 18L through a line to which a gas spring 84 is connecting for attaining suspension stroke. The chamber 78d interconnects the remaining chambers of the suspension units 16L and 18L through a line to which a gas spring 86 is connected to attaining suspension stroke.

With the above structure, upward movement of the piston rod 76e in the drawing causes the volumes of the chambers 76a and 76c to decrease while the chambers 76b and 76d to increase, thus increasing the loads on the right front wheel and the left rear wheel while reducing the loads on the left front wheel and the right rear wheel. On the contrary, downward movement of the piston rod 76e in the drawing causes the volumes of the chambers 76a and 76c to increase while the chambers 76b and 76d to decrease, whereby the loading conditions of the respective wheels are varied reversely. Accordingly, by selecting the direction of stroke of the piston rod 76e and the amount of its stroke, load movement between the right front and rear wheels 72R and 74R is attained similarly to the previous embodiments, thus making it possible to produce a yaw moment in the direction of causing oversteer at the time of power drift during cornering.

Further, in case of upward movement of the piston rod 78e in the drawing, the volumes of the chambers 78a and 78c are decreased while the volumes of the chambers 78b and 78d are increased, thus increasing the pressures of the gas springs 80 and 82 for the right front and rear wheels are increased while the pressures of the gas springs 84 and 86 for the left front and rear wheels are decreased. By this, the rated pitch rigidity at the right front and rear wheels with respect to the overall pitch rigidity is increased, whereas the rated pitch rigidity at the left front and rear wheels is lowered. When the piston rod 78e is lowered in the drawing, the volumes of the chambers 78a and 78c are increased while the volumes of the chambers 78b and 78d are decreased, thus reducing the rated pitch rigidity at the right front and rear wheels while increasing the rated pitch rigidity at the left front and rear wheels. Accordingly, by suitably selecting the direction of stroke of the piston rod 78e and the amount of stroke, the power drift control similar to those of the two previous embodiments can be attained.

What is claimed is:

1. A power drift control device for a vehicle comprising:
   cornering detecting means for detecting cornering of the vehicle and producing a signal representative of same;
   acceleration detecting means for detecting acceleration of the vehicle and producing a signal representative of same;
   yaw moment producing means responsive to said signals from said cornering detecting means and said acceleration detecting means for producing a yaw moment in the direction of causing oversteer and variable at a yaw moment variation rate depending upon variation of acceleration of the vehicle;
   steering wheel angle detecting means for detecting a steering wheel angle and producing a signal representative of same; and
   yaw moment variation rate altering means responsive to said signal from said steering wheel angle detecting means for altering said yaw moment variation rate in such a manner that said yaw moment variation rate increases as said steering wheel angle increases.

2. A power drift control device as claimed in claim 1 wherein said yaw moment producing means distributes sideway load movement caused by cornering of the vehicle to front wheels and rear wheels of the vehicle differently.

3. A power drift control device as claimed in claim 2 wherein said yaw moment producing means is operative so that a smaller load movement occurs at the front wheels and a larger load movement occurs at the rear wheels.

4. A power drift control device as claimed in claim 3 wherein said yaw moment producing means comprises roll rigidity control means for controlling a roll rigidity of the vehicle in such a manner that a smaller roll rigidity is attained at the front wheels and a larger roll rigidity is attained at the rear wheels.

5. A power drift control device as claimed in claim 3 wherein said yaw moment producing means comprises pitch rigidity control means for controlling a pitch rigidity of the vehicle in such a manner that a larger pitch rigidty is attained at a cornering outside pair of the front and rear wheels and a smaller pitch rigidity is attained at a cornering inside pair of the front and rear wheels.

6. A power drift control device as claimed in claim 3 wherein said yaw moment producing means and said yaw moment altering means comprises a control unit which is operative to determine a ratio of load movement between front wheels to overall load movement on the basis of acceleration of the vehicle and a steering wheel angle, said load movement between the front and rear wheels being performed so that said ratio is satisfied.

7. A power drift control device as claimed in claim 6 wherein said ratio is determined only on the basis of acceleration of the vehicle when a steering wheel angle is smaller than a predetermined value.

8. A power drift control device as claimed in claim 7 wherein said yaw moment producing means comprises fluidly operated suspension units for the front and rear wheels and valve means for controlling supply of fluid pressure to said suspension units in such a manner that a fluid pressure within a suspension unit for cornering outside one of the front wheels is decreased while a fluid pressure within a suspension unit for cornering inside one of the front wheels is increased and a fluid pressure within a suspension unit for cornering outside one of the rear wheels is increased while a fluid pressure within a suspension unit for cornering inside one of the rear wheels is decrease, said increase and decrease of the fluid pressures within said suspension units being of the same absolute amount.

9. A power drift control device as claimed in claim 7 wherein said yaw moment producing means comprises fluidly operated suspension units for the front and rear wheels and valve means for controlling supply of fluid pressure to said to said suspension units in such a manner that a fluid pressure within the suspension unit for the rear wheel of a conering outside pair of the front and rear wheels is increased while a fluid pressure within the suspension unit for the front wheel of the cornering outside pair is decreased and a fluid pressure within the suspension unit for the rear wheel of a cornering inside pair of the front and rear wheels is decreased while a fluid pressure within the suspension unit for the front wheel of the cornering inside pair is increased, said increase and decrease of the fluid pressures within said suspension units being of the same absolute amount.

* * * * *